United States Patent [19]

Dancik

[11] 3,912,323
[45] Oct. 14, 1975

[54] PROTECTIVE COVER FOR CABOVER CAMPER

[76] Inventor: Robert R. Dancik, 7753 Navajo, Denver, Colo. 80221

[22] Filed: Nov. 5, 1973.

[21] Appl. No.: 413,104

Related U.S. Application Data

[63] Continuation-in-part of Ser. No. 367,110, June 5, 1973, abandoned.

[52] U.S. Cl. ............ 296/23 MC; 296/91; 296/95 R
[51] Int. Cl.² ........................................... B60P 3/32
[58] Field of Search ........ 296/23 R, 23 MC, 15, 91, 296/95 R, 84 K; 180/68 P

[56] References Cited
UNITED STATES PATENTS

| | | | |
|---|---|---|---|
| 1,020,336 | 4/1912 | White | 296/91 |
| 2,737,411 | 3/1956 | Potter | 296/15 |
| 2,779,621 | 1/1957 | Vale | 296/23 R |
| 2,981,564 | 4/1961 | Lieberman et al. | 296/145 |
| 3,656,798 | 5/1970 | Dodgen | 296/23 MC |

*Primary Examiner*—Robert J. Spar
*Assistant Examiner*—Donald W. Underwood
*Attorney, Agent, or Firm*—Thomas W. O'Rourke

[57] ABSTRACT

An easily removable protective cover for shielding the front portion of an overhanging camper, which portion extends over the cab of the supporting vehicle, the protective cover shielding the overhang, and particularly the windows therein, from encrustment, nicks or penetration by airborne debris such as rocks thrown up by other vehicles, insects or dust, the protective cover preferably comprising a rectangular sheet of material at least a portion of which is transparent and placed over the window portion of the camper overhang, and further which is provided with securing means such as snaps to secure the cover in position, and, in a particularly useful embodiment, a double layer pneumatically inflated surface which resists encrustment and splattering.

4 Claims, 4 Drawing Figures

PROTECTIVE COVER FOR CABOVER CAMPER

This application is a continuation-in-part application of Robert R. Dancik, application Ser. No. 367,110, filed June 5, 1973 now abandoned.

BACKGROUND OF THE INVENTION

1. Field of the Invention

The present invention relates generally to protective covers for campers and more particularly to a protective cover which, in part or whole, is transparent and is adapted to readily be secured to the leading, overhang portion of a truck-supported camper.

2. Description of the Prior Art

It is well known that truck-supported campers, either chasis mounted or bed supported, make use of the space immediately above the truck cab. Usually, this space is, as a result of restricted head room, employed as a sleeping area. Also, windows are almost universally provided in the leading surface of this overhanging portion. When touring, it is not unusual for children to view the surroundings through the leading window.

As a leading surface, the exterior of the overhang is subject to impingement by the usual airborne debris encountered by vehicles. This ranges from a distinct nuisance in the instance of insects, to a distinct danger in the instance of airborne rocks and missiles which are capable of penetrating the window and possibly injuring occupants.

With regard to the former problem, the elevated location over the cab of the truck makes it quite difficult to clean both the window and the metal portions of the leading surface of camper overhang. Truck roofs provide neither safe purchase or adequate strength to support an individual to permit cleaning.

In the latter instance, the danger is real and unresolved.

SUMMARY OF THE INVENTION

The present invention, which provides a heretofore unavailable means for protecting the leading surface of a camper overhang from impingement, be it from unsightly insects or lethal missiles, comprises an easily removable covering with at least a portion being of a transparent material which will permit use of the camper windows when covered. The covering can be easily removed for convenient cleaning and also provides protection against both nicks and breakage by rocks thrown from other vehicles.

Accordingly, it is a principle object of the present invention to provide a cover for leading surfaces of camper overhangs to protect the leading surface from airborne debris.

Another object of the present invention is to protect the windows in the leading surface of a cabover camper from breakage by airborne missiles.

Yet another object of the present invention is to provide a cabover camper cover which protects the front surface of the camper from becoming nicked from flying stones and other debris.

Still another object of the present invention is to provide a cabover camper cover which can be quickly and easily secured to the camper and, alternatively, which can be also readily and easily removed therefrom to facilitate cleaning of matter collected upon the cover.

Yet another object of the present invention is to provide a pneumatically inflated surface which resists impingement of insects and other matter thereon and which vibrates to, to a substantial extent, function as a self-cleaning surface.

These and other objects and features of the present invention will become apparent from the following description.

DETAILED DESCRIPTION OF THE INVENTION

Figure 1:
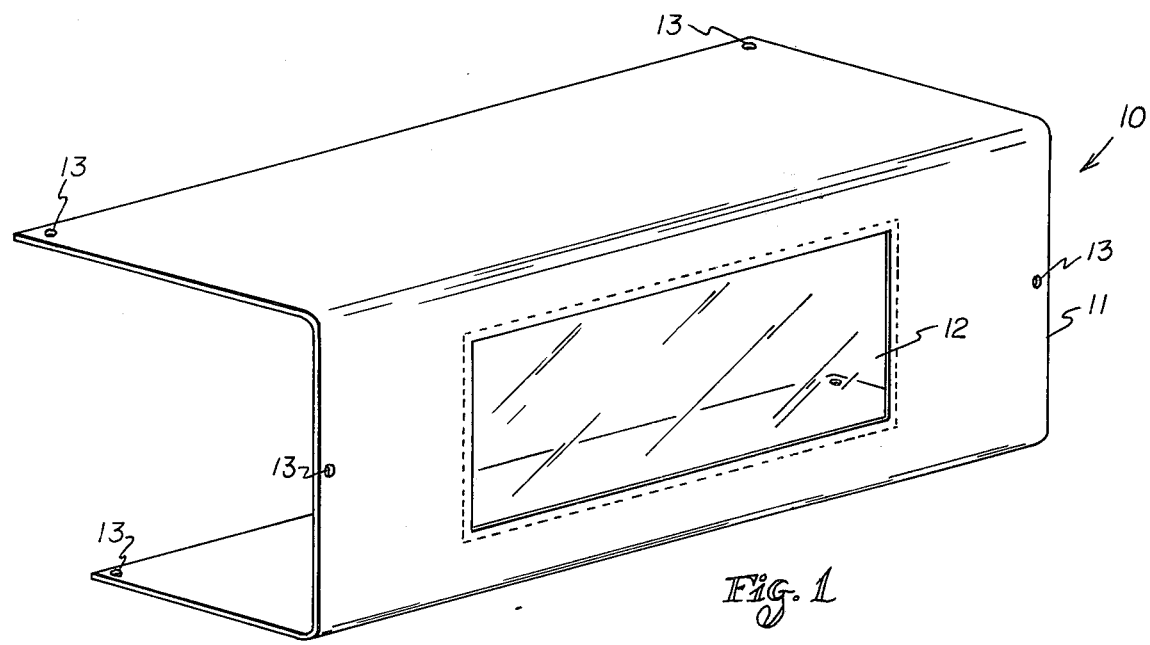
FIG. 1 is a perspective view of an embodiment of the instant invention.

Turning now to the drawings, wherein like components are designated by like reference numerals throughout the various figures, a cover for campers of the type of which the instant invention is concerned is illustrated in FIG. 1 and generally designated by the reference numeral 10. Cover 10 comprises a pliable material 11, such as canvass or a synthetic material as that used for the tops of convertible automobiles, and is of a size appropriate to cover the leading surfaces of most campers, which tend to be relatively standardized, but which may be altered to fit any such camper. At least a portion of cover 10 is of a transparent window material 12 which is secured in material 11 be sewing or, preferably, by means of zippers (not shown) which permit easy replacement of the more readily damaged transparent window material 12.

Cover 10 includes along the periphery thereof a number of releasable securing means 13, preferably snaps, to facilitate attachment and detachment to and from the camper. Thus, cover 10 can be easily and conveniently removed for cleaning.

Figure 2:
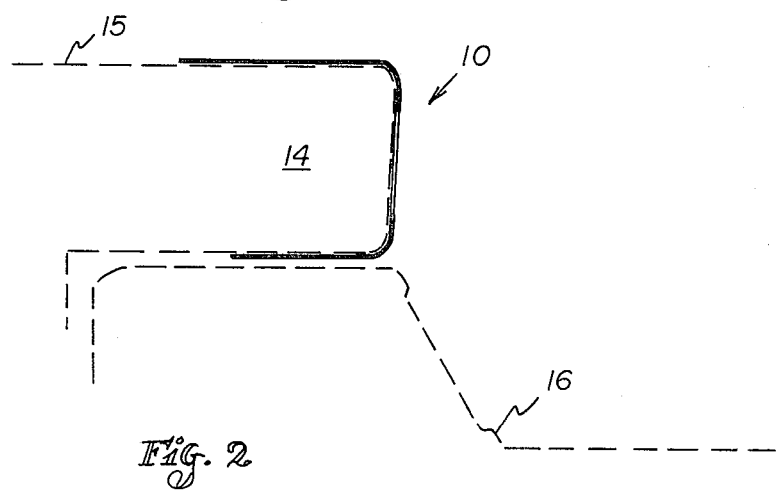
FIG. 2 is an in place side view of the embodiment of FIG. 1.

As shown in FIG. 2, cover 10 is secured to the overhang 14 of a camper 15 which, in turn, is carried by a truck 16. Accordingly, the leading surface and window portion of overhang 14 is protected for airborne debris by covers 10. Further, cover 10 can be readily detached by releasable securing means 13, illustrated in FIG. 1, to permit convenient removal and cleaning of cover 10 in a more accessible position. Cover 10, and particularly transparent portion 12, protects the corresponding leading window material 12 of camper overhang 14 from penetration, breakage and encrustation of insects and other matter and obviates the need to frequently clean inaccessible camper overhang 14.

Figure 3:
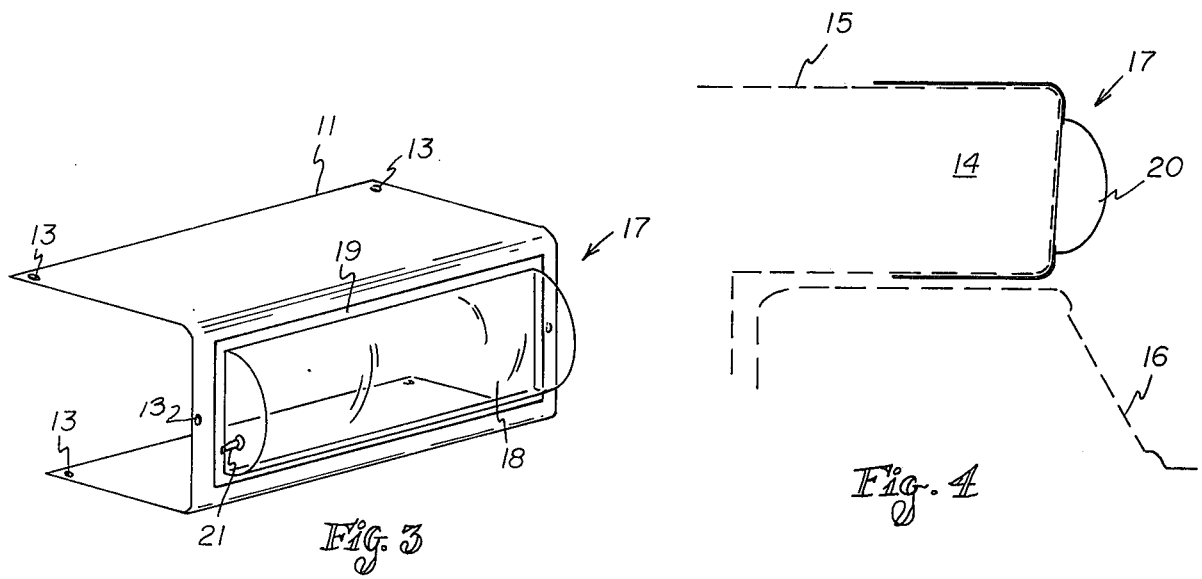
FIG. 3 is a perspective view of a variant embodiment of the instant invention.
Figure 4:
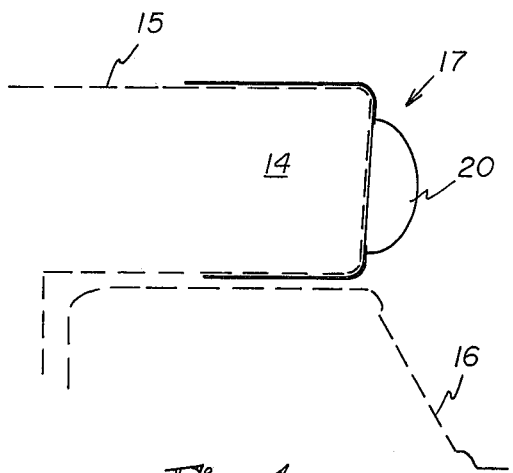
FIG. 4 is an in place side view of the embodiment of FIG. 3.

FIGS. 3 and 4 illustrate a particularly advantageous embodiment of the instant invention. Modified cover 17 is similar in construction to cover 10, as shown in FIG. 1, with regard to the construction and dimensions of pliable material 11 and securing means 13. However, a second transparent sheet 18 is hermetically sealed at edges 19 to cover 17. Though illustrated as corresponding to transparent material 12, it is to be understood that sheet 18 may extend across the entire leading edge of modified cover 17. An air valve 21 is provided to facilitate inflation of hermetically sealed sheet 18 to form an air space 20, as shown in FIG. 4, across the leading edge of cover 17.

The pneumatic pressure within air space 20 tautly stretches sheet 18. Debris, and particularly insects, will be cushioned and deflected by the yieldable pneumatically supported surface of sheet 18. In addition, the relatively tautly stretched surface of sheet 18 will tend to vibrate, thereby displacing dust, insects and other debris which, despite the cushioning nature of sheet 18, may lodge thereon. Yet another advantage of the pneumatically supported surface is the protruding profile of sheet 18, which is apparent from FIG. 4, and which tends to deflect the air and carry debris around the leading surface of camper overhang 14 rather than into such surface. Of course, the double thickness of sheet 18 in addition to material 11 or transparent section 12 covering the leading surface of camper overhang 14 affords substantially greater protection in the case of dense, rapidly moving missiles which may tend to penetrate singly-thickness cover 10.

From the above description, it is evident that the instant invention affords utility and advantages with regard to convenience, protection from damage and safety.

Although two embodiments of the present invention have been illustrated and described, it is anticipated that various changes and modifications will be apparent to those skilled in the art, and that such changes may be made without departing from the scope of the invention as defined by the following claims.

What is claimed is:

1. A cover for at least the leading surface of the overhang of a cabover camper, comprising: a rectangular pliant sheet of material, a window portion of transparent material defined in the pliant sheet of material, releasable fastening means located adjacent the periphery of the pliant sheet of material for removably attaching the cover over the leading surface of the overhang of a cabover camper, a second transparent sheet of pliant material hermetically sealed over at least a portion of the area of the pliant sheet of material and covering the window portion thereof, and inflation means for facilitating the flow of a pneumatic fluid into the volume defined by the hermetically-sealed second sheet and the cover, whereby a pneumatically-supported surface is provided to cushion debris impacting thereon and thus minimize encrustment of such debris, and to function as a self-cleaning surface by vibration.

2. A camper cover as set forth in Claim 1 wherein the releasable fastening means are snaps.

3. A cover as set forth in claim 1 wherein valve means are included therein to permit inflation of the volume between the cover and the transparent sheet.

4. A camper cover as set forth in claim 1 wherein the cover is secured to a cabover camper having an overhang portion with a substantially flat, vertical leading surface with a window defined in the leading surface, the cover extending across the leading surface and onto the adjacent upper and lower surfaces of the overhang, and the transparent portion of the cover extending over the window defined in the leading surface.

* * * * *